US005914716A

United States Patent
Rubin et al.

[19]

[11] Patent Number: 5,914,716
[45] Date of Patent: Jun. 22, 1999

[54] SLIDE OUT INTERFACE BAR

[75] Inventors: Hugh V. Rubin; Mark A. Malamud; Renee Marceau, all of Seattle, Wash.

[73] Assignee: Microsoft Corporation, Redmond, Wash.

[21] Appl. No.: 08/895,525

[22] Filed: Jul. 17, 1997

Related U.S. Application Data

[63] Continuation of application No. 08/340,267, Nov. 15, 1994, abandoned.

[51] Int. Cl.$^6$ ............................................. G06F 3/14
[52] U.S. Cl. .................................. 345/347; 345/339
[58] Field of Search ........................... 345/347, 353, 345/354, 352, 339, 348, 349, 341, 326, 974, 977, 973

[56] References Cited

U.S. PATENT DOCUMENTS

| | | | |
|---|---|---|---|
| 4,896,291 | 1/1990 | Gest et al. | 395/156 |
| 5,305,435 | 4/1994 | Bronson | 359/159 |
| 5,347,626 | 9/1994 | Hoeber et al. | 395/156 |
| 5,347,628 | 9/1994 | Brewer et al. | 345/351 |
| 5,363,481 | 11/1994 | Tilt | 395/156 |
| 5,425,140 | 6/1995 | Bloomfield et al. | 395/156 |
| 5,434,965 | 7/1995 | Matheny et al. | 395/159 |
| 5,473,745 | 12/1995 | Berry et al. | 395/157 |
| 5,495,566 | 2/1996 | Kwatinetz | 395/157 |
| 5,546,527 | 8/1996 | Fitzpatrick et al. | 395/159 |
| 5,565,888 | 10/1996 | Selker | 345/146 |
| 5,627,567 | 5/1997 | Davidson | 345/173 |
| 5,657,049 | 8/1997 | Ludolph et al. | 345/145 |
| 5,745,096 | 4/1998 | Ludolph et al. | 345/340 |
| 5,757,358 | 5/1998 | Osga | 345/146 |

OTHER PUBLICATIONS

Now Software, Inc., "Now Utilities" Manual, pp. 4–1–4–5, 1991.
"Automatic Drop Down List or Combination Boxes," IBM Technical Disclosure Bulletin, Nov. 1992, vol. 35(6), p. 256.
"Automatic Selection with Mouse Pointer," IBM Technical Disclosure Bulletin, Oct. 1995, vol. 38(10), pp. 549 and 550.
"Contextual Animated–Open Window Control," IBM Technical Disclosure Bulletin, Apr. 1992, vol. 34(11), pp. 68 and 69.
Blain, Derrel et al., "Real–World Programming for OS/2 2.1," SAMS Publishing—a Division of Prentice Hall Computer Publishing, 1993, pp. 219, line 38–41, and 220, line 13–21.
"Algorithm for Decreasing the Error Rate of Data Entered on a Touch–Sensitive Terminal," IBM Technical Disclosure Bulletin, Mar. 1991, vol. 33(10A), pp. 223–227.
"Notebook Control Cascading Tab Choices," IBM Technical Disclosure Bulltin, Sep. 1992, vol. 35(4B), pp. 284–286.
"Spin Actions," IBM Technical Disclosure Bulletin, Mar. 1994, vol. 37(3), pp. 119 and 120.
Gore, Andrew, and Mitch Ratcliffe, "Newton's Law—A Digital Nomad's Guide," Random House Electronic Publishing, New York, 1993, pp. 130–144.
"User's Guide—Microsoft® Windows™ and MS–DOS® 6," Microsoft Corporation, 1993, pp. 24–28.
Harrington, Jan L., "Macintosh Buttons and Amiga Gadgets," Dr. Dobb's Journal, Jan. 1987, pp. 40–42, 44, 47–49, 64, 66, 68–70, 72–74, and 79–80.

*Primary Examiner*—Matthew M. Kim
*Assistant Examiner*—Crescelle N. dela Torre
*Attorney, Agent, or Firm*—Christensen O'Connor Johnson & Kindness PLLC

[57] ABSTRACT

A computer system has an improved graphical user interface feature. The improved graphical user interface displays a target image representing a retracted slide out command bar containing a set of selectable computer resources. When the user moves a display pointer to a location near the target image, the target image is replaced by the slide out command bar. The slide out command bar remains visible and its computer resources accessible via the mouse-controlled display pointer until the user either clicks the mouse or moves the display pointer outside an extended detection region of the graphical user interface associated with the unretracted slide out command bar.

40 Claims, 3 Drawing Sheets

SLIDE OUT INTERFACE BAR

CROSS-REFERENCE TO RELATED APPLICATION

This application is a continuation of U.S. patent application Ser. No. 08/340,267, filed Nov. 15, 1994, now abandoned.

FIELD OF THE INVENTION

This invention relates to the field of user interfaces for computer systems, and more particularly to graphical display type interfaces wherein the user selects a graphical representation, or icon, from a collection of graphical representations, or icons, that are displayed upon a display screen. The selected graphical representation corresponds to an actual computer resource which may be, for example, a command, a control, a file or an action performed on an object.

BACKGROUND OF THE INVENTION

In recent years, there has been extraordinary expansion in the ownership and utilization of computers. Computers, once considered primarily the tools of scientists, can now be found in a substantial portion of homes and businesses. Though partial credit for the unprecedented growth in the utilization of computers is attributable to lower costs associated with manufacturing computers and related peripheral devices which has made such equipment affordable to a much larger segment of the public, the credit is equally, if not more, attributable to the enhanced versatility, ease in learning to use, and ease of using computers as a result of the improved operating systems and applications software running on the computers.

It is therefore very important when designing an operating system or application program, and more particularly a user interface for such software, to provide a high degree of user friendliness, which incorporates ease of learning and ease in using the operating system or application program. Users appreciate operating system and application program interfaces which enable them to accomplish their computer related tasks intuitively and without the need to master obscure and complicated commands or routines. A considerable portion of the computer users today base their preference for a particular operating system or application program upon such software's ease of use which consequently results in a savings of time and effort for the user, as well as display features provided by the operating system or application program software which enhance the aesthetic appeal of the interface.

The Windows® *Microsoft Corporation* operating system and its series of menus and buttons has significantly simplified using the personal computer. The Windows® *Microsoft Corporation* operating system is unquestionably easier to learn than earlier text command based operating systems. Even more importantly, the Windows® *Microsoft Corporation* operating system enables a user to access a great number and variety of computer resources from any given screen by selecting from the title bars, menu items, and control buttons provided by the graphic user interface. As used herein, the term computer resource is intended to encompass a wide variety of data and functions provided by a computer including for example files, directories, programs, commands, and controls.

It is of course desirable for an operating system or application program to provide access to a large quantity of computer resources via a single display screen. However, increasing the computer resources accessible via the single display screen requires providing additional graphical user interface targets such as menu items, command bars, and/or control buttons which, in turn, increases cluttering of the display screen. Cluttering degrades both the ease of use and the aesthetic appeal of a graphical user interface. Therefore, one consideration when developing a user interface for an operating system or application program is to provide the user with access to a large quantity of computer resources via a single display screen while avoiding filling the limited available space of the display screen of the graphical user interface with target images associated with the computer resources. Of course the difficulty in meeting these seemingly contradictory objectives is enhanced in new hand-held or reduced size computers having smaller display screens.

One way to avoid consuming the limited area of a display screen with target images without reducing the number of computer resources presented on a single display screen is to reduce the size of the graphical user interface target images and their associated detection regions. However, reducing the size of the detection regions for the graphical user interface target images reduces the margin for error when positioning the pointer and increases the level of precision needed to position a mouse controlled display pointer for selecting a computer resource associated with a target image. As a result, users may experience an increased difficulty in positioning a pointer within a detection region and selecting a computer resource associated with the target image displayed within the detection region. This problem is most evident in computers having smaller size display screens.

A known alternative to reducing the size of the target images displayed upon a graphical user interface is to replace a set of related target images by a representative target image which consumes considerably less display screen space than the target images. When a user selects the representative target image by moving a mouse-controlled pointer within the detection region associated with the representative target image and clicking (i.e., pressing down and releasing) a mouse button, the set of related target images are displayed upon the display screen. Thus, graphic user interfaces incorporating the above target image "hiding" feature conserve the limited display screen space by displaying a set of targets only after a user points to and clicks upon an associated target image.

Known graphical user interfaces for operating systems and applications programs have incorporated the above described "hiding" feature into menu bars. These known menu bars display a set of menu headings. After a user moves the pointer within the boundaries of the detection region for one of the menu headings and then clicks a mouse button, the graphical user interface displays a set of target images below the menu heading representing computer resources. The set of target images are removed from the display when a user clicks a mouse button.

Also, a known command bar provides space saving characteristics. When not selected, the command bar is represented on the graphical user interface by an icon which, when selected using the pointing to the icon and clicking a mouse button, is replaced by a full-size command bar. The full-size command bar is replaced by the icon when a user clicks a mouse button or moves the pointer outside the detection region associated with the full-size command bar.

The above-described known graphical user interface features promote conservation of screen space and reduce clutter while providing access to a large quantity of computer resources. However, the manner in which the "hidden" computer resources are presently accessed, namely pointing and clicking on a small icon, presents certain drawbacks. The user may click the mouse while the pointer is not within the detection region of the intended item. Even when the pointer is originally positioned by a user within the boundaries of a detection region, the user may inadvertently move the pointer to a position outside the boundary while clicking the mouse button. Such occurrences are not uncommon when the graphical user interface provides small detection regions and/or when the user is in a hurry. Furthermore, though clicking a mouse button seems to be a relatively simple task, having to repeat the act one or more times due to a previous erroneous positioning of the pointer while clicking the mouse button can be annoying to a user.

Another concern of computer interface developers is the ease with which the users learn to use a new interface feature. One of the advantages provided by graphical user interfaces for operating systems and application programs is the ease with which users learn to invoke the various controls and commands provided by such software—often without formal training or consulting an instruction manual. Much of the success in improving the ease with which users learn to use the operating systems or application programs is attributed to the large amount of information provided at each decision making step. Removing some of this information from constant view adversely affects the user's ability to discover and utilize the hidden features without resorting to formal instruction. Therefore, when certain information is removed from a screen in order to reduce clutter, it is important from the user's standpoint that such retracted graphic user interface features remain easily discoverable without having to resort to an instruction manual.

SUMMARY OF THE INVENTION

It an object of the present invention to maintain a high degree of discoverability of retracted graphic user interface features.

Another object of the present invention is to reduce the occasions in which a user clicks a mouse to gain access to, or activate, a computer resource.

It is yet another object of the present invention to avoid unwanted activation of graphic user interface elements by a user when using a graphical user interface selection mechanism to select computer resources represented by target images on the display screen.

The above and other objects are achieved by an improved graphical user interface comprising an apparatus and method for displaying items on a display screen representing computer resources accessible by means of a user controlled graphical selection device. The graphical user interface displays a target image representing a retracted graphical interface bar within a window or work area for a particular application user interface. A target detection region (including the region occupied by the target image) is defined in the graphic user interface so that when a pointing mechanism is positioned within the target detection region while the target image is displayed, an unretracted bar image replaces the target image on the display screen. When the unretracted bar image replaces the target image positioned at an edge of the display screen, a visual impression is created (when the command bar appears) that the unretracted bar image is sliding out from the edge of the display screen. When the unretracted bar image replaces the target image, the graphical user interface modifies a table identifying detection regions on the current display screen and their associated computer resources in order to provide access by means of the user controlled graphical selection device to the computer resources represented on the displayed unretracted bar image.

The unretracted bar image remains in its unretracted state while the user selects a computer resource represented on the unretracted bar image. When the user moves the pointer outside an extended detection region associated with the unretracted bar image, the unretracted bar image and its associated extended detection region are replaced on the display screen by the target image and its detection region.

The retractable graphical interface bar of the present invention is easy to discover and operate because the retractable bar automatically slides out (i.e. without the user clicking a mouse button or light pen) when the pointer is moved to an area in close proximity to the target image. Such ease of discovery and use can not be assured if a user must click a mouse button or light pen in order cause the retracted command bar to be displayed. Furthermore, the retractable graphical interface bar improves the graphical user interface by supporting the access to a significantly increased number of computer resources on a single display screen without increasing crowding of the display screen.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF THE INVENTION

Figure 1:
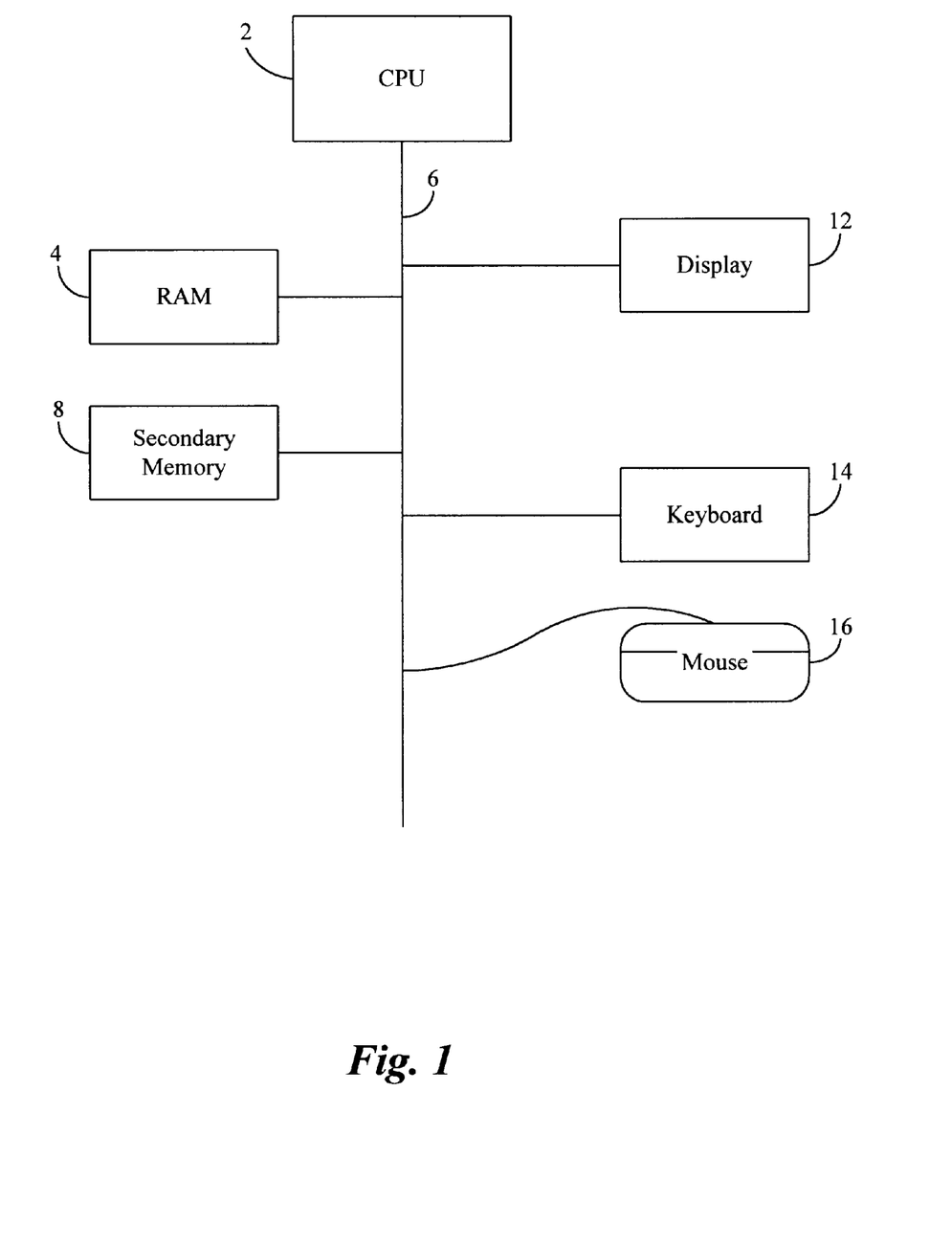
FIG. 1 is a schematic drawing of an exemplary computer system incorporating the present invention.

The computer system for practicing the present invention is schematically illustrated in FIG. 1 and comprises a central processing unit (CPU) 2 coupled by means of a bus 6 in a known manner to a random access memory (RAM) 4. The CPU 2 is also coupled to a non-volatile secondary memory 8 for storing various system and applications routines and programs. The CPU 2 is coupled in known manner to a number of user interface components including a display 12. The display 12 may be any of a number of known display devices including, for example, monochrome and color cathode ray tubes and LCD displays. In accordance with an illustrated embodiment of the present invention, the display 12 presents in conjunction with other components of a graphical user interface, a target image associated with a retracted window bar.

A user controls the positioning of a pointing mechanism comprising, for example, a display pointer on a display screen of the display 12 via a mouse 16 and/or a keyboard 14 or other suitable user controlled selection device such as a light pen to facilitate the submission of graphic user interface selection signals to the CPU 2. Suitable user controlled graphical selection devices provide a clicking mechanism which transmit a signal at least when a user presses the clicking mechanism. In accordance with the illustrated embodiment of the present invention, when the display pointer is positioned within a detection region associated with the first target image for a period of time, the target image is automatically replaced by the graphical user interface by an unretracted window bar without any further selection actions by the user such as clicking a mouse button or light pen.

Though not shown in FIG. 1, the computer system includes a number of peripheral units as would be known to those skilled in the art. The computer system hardware depicted in FIG. 1 is a representative hardware configuration of a computer system embodying the present invention. It would of course be understood by one of ordinary skill in the art that the present invention encompasses other computer system hardware configurations and is not limited to the computer system hardware configuration schematically illustrated in FIG. 1 and described above.

Figure 2:
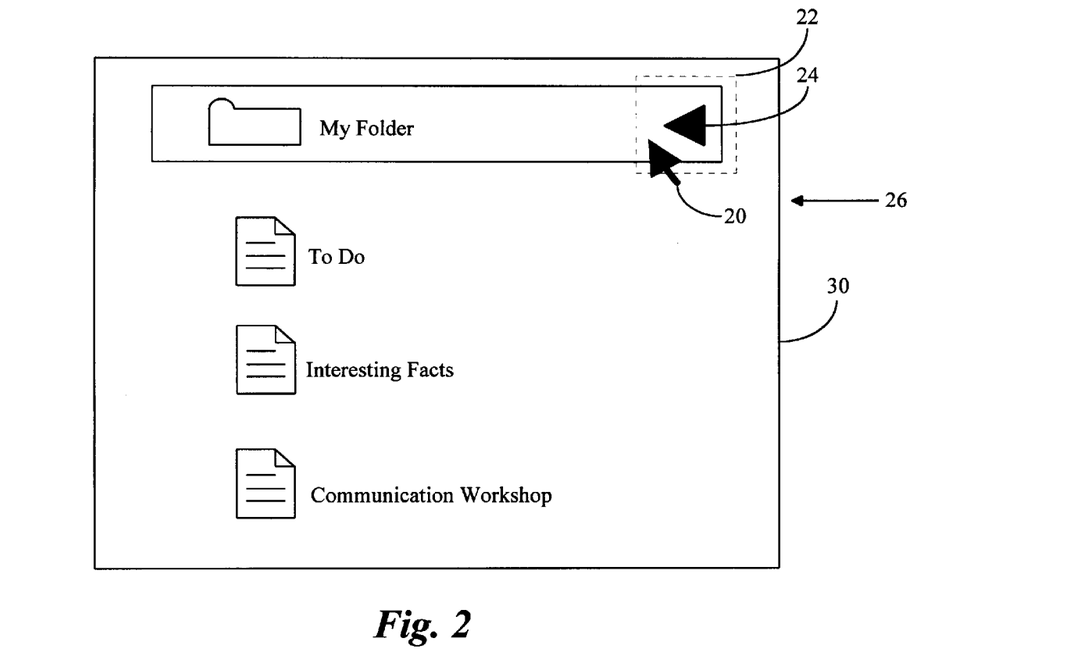
FIG. 2 is an illustrative reproduction of a display screen depicting a target image representing a slide out window bar in the retracted state.

Turning now to FIG. 2, a display screen of a graphical user interface incorporating the present invention is illustrated and includes a known mouse-controlled display pointer 20. When the display pointer 20 is positioned outside a detection region 22 for a retractable slide out window bar, the display screen displays an isosceles triangle 24 oriented so that its base lies adjacent an edge 30 of a window 26. The triangle 24 represents the retractable slide out window bar in a retracted state. This arrangement of the triangle 24 upon the edge of the window creates the appearance of a pull-out tab, and the solitary triangle 24 set away from the rest of the display screen features invites inquiry by even the least experienced user of a graphical user interface. On the whole, the shape, orientation, and positioning of the displayed triangle 24 representing the retracted slide out window bar enhance the discoverability of the slide out window bar feature of the graphic user interface and, therefore, provides a desirable target image. A wide variety of suitable alternative target images to the exemplary triangle 24 will be known to those skilled in the art.

As illustrated in FIG. 2, the detection region 22, within which the user positions the display pointer 20 in order to cause the retractable slide out window bar to unretract, encompasses and extends beyond the triangle 24. It will be readily appreciated that extending the actual region of detection beyond the triangle 24 reduces the amount of searching and the accuracy of placement of the pointer 20 required by the user to cause an unretracted window bar to be displayed within the window 26. The area of the detection region 22 should be large enough to facilitate easy positioning of the pointer within the detection region 22. In a preferred embodiment of the present invention, the detection region 22 is a square region encompassing the area of the screen covered by the triangle 24 and having sides measuring 0.5 cm. in a standard window. Other acceptable shapes and sizes for the detection region 22 may, of course, be used.

The detection region 22 may be smaller or larger and is based upon a number of factors, including the display resolution, the quantity of display features which are concurrently displayed within the window, and the size of the display features. Increasing the size of the detection region 22 increases the chances that a user will inadvertently actuate the slide out window bar. On the other hand, decreasing the size of the detection region 22 reduces the ease with which the slide out window bar is discovered and accessed.

When the user positions the display pointer 20 in the detection region 22 associated with the triangle 24 for a period of time exceeding a programmed delay period, a window bar 28 replaces the triangle 24 on the display screen. In the illustrated embodiment of the present invention, exceeding the programmed delay period is detected by detecting the display pointer 20 within the detection region 22 a plurality of consecutive times until the time elapsed between first detecting the display pointer 20 in the detection region 22 and a current time exceeds the programmed delay.

The step of replacing the target image includes displaying a time sequence of partial images on the display screen corresponding to progressively larger fractions of a full view of the unretracted window bar image. This sequence of partial images creates the visual impression to a user of a window bar sliding out from the edge 30 of the window 26 to an unretracted state/position. This animation feature also enhances the ease in discovering and learning to use this slide out interface feature by providing an enhanced visual depiction of changes occurring in the state of the graphical user interface.

Figure 3:
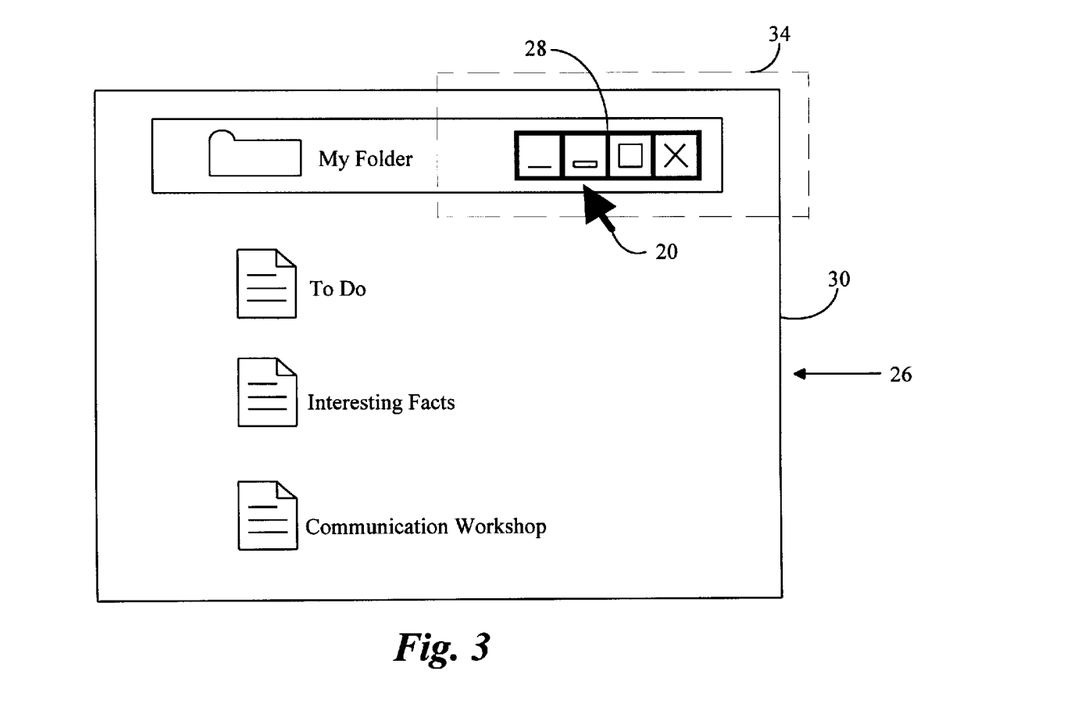
FIG. 3 is an illustrative reproduction of a display screen depicting a slide out window bar in the unretracted state.

FIG. 3 illustrates a window 26 displaying a fully unretracted slide out graphical interface bar (in particular, a slide out window bar 28 which includes icons for the known minimize, restore, maximize and close window commands). It is noted that the retracting and unretracting feature described herein can be incorporated into other graphical user interface components in order to conserve space, yet provide easy discoverability of the retracted interface bars such as, for example, tool bars and menu bars.

The slide out window bar 28 shown in FIG. 3 has associated with it an extended detection region 34. The extended detection region 34 represents the area of the screen in which the user may move the display pointer 20 while the slide out window bar 28 is unretracted without causing the graphic user interface to replace the slide out window bar 28 by the triangle 24 (shown in FIG. 2). In the preferred embodiment, the boundaries of the extended detection region 34 extend well beyond the slide out window bar 28. The choice of size of the extended detection region 34 depends upon a number of considerations, including the display resolution, the amount of adjacent free space on the display screen and the size of the slide out window bar 28.

The graphical user interface senses in a known manner the position of the mouse controlled display pointer 20 whenever the position of the display pointer 20 is changed. When the slide out window bar 28 is displayed upon the screen, as it is in FIG. 3, the graphical user interface compares the position of the display pointer 20 to the boundaries of the extended detection region 34. If the user re-positions the display pointer 20 outside the extended detection region 34 for a period of time exceeding a programmed delay period, or if the user clicks the mouse, the graphical user interface replaces the slide out window bar 28 on the window by the triangle 24 as shown in FIG. 2. In the illustrated embodiment of the present invention, exceeding the programmed time period is detected by detecting the display pointer 20 outside the extended detection region 34 a plurality of consecutive times until the time elapsed between first detecting the display pointer 20 outside the extended detection region 34 and a current time exceeds the programmed delay.

In accordance with an embodiment of the present invention, replacing the slide out window bar 28 by the triangle 24 includes displaying a time sequence of partial images on the display screen corresponding to progressively smaller fractions of a full view of the unretracted window bar image, thereby creating the visual impression to a user of a window bar sliding back into the edge of the window 26 to a retracted state/position.

Although FIGS. 2 and 3 show only a single slide out command bar/detection region, it will be readily understood that a window may include multiple retractable command bars. These bars are preferably displayed around the periphery of the window since positioning the target images for the slide out command bars near the edges of a window reduces the likelihood that a user will inadvertently unretract a retracted slide out command bar.

Having described the display screen appearance and the general use/operation of the slide out command bar, the steps followed by the graphical user interface in detecting when the user positions the display pointer 20 in the detection region 22 and the extended detection region 34 and automatically unretracting and retracting the slide out command bar on a time delayed basis, will now be described. These steps are summarized in the flow diagrams shown in FIGS. 4 and 5.

Figure 4:
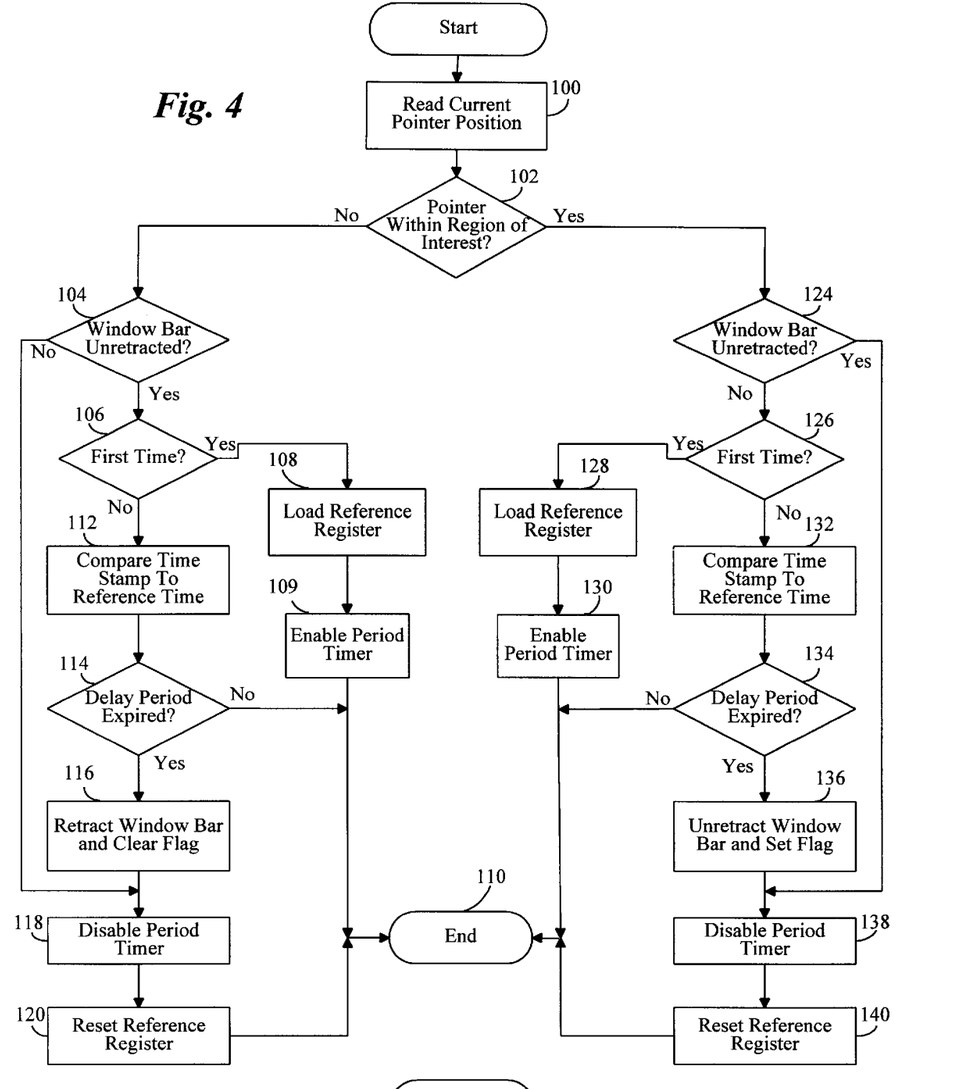
FIG. 4 is a flow diagram illustrating the steps executed by a graphical user interface in controlling the display of a retractable graphical interface bar and the access to computer resources represented within the graphical interface bar.

The steps illustrated by the flow diagram in FIG. 4 are executed in the computer system by the graphical user interface on a partially periodic, partially event driven, messaging format. The CPU 2 executes the applicable steps of the flow diagram shown in FIG. 4 each time the graphical user interface senses in a known manner that the position of the display pointer 20 has been altered. In such a case, the CPU 2 updates the current position of the display pointer in preparation for executing the applicable steps shown in FIG. 4.

Since the graphical user interface is programmed to delay unretracting the window bar 28 when the display pointer is moved within the detection region 22 and to delay retraction of the window bar 28 when the display pointer is moved outside the extended detection region 34, a period timer is employed to cause the computer system's graphical user interface to execute the steps of FIG. 4 even when the position of the display pointer is not altered in order to determine whether the delay period has expired and, if the delay period has expired, to toggle the state of the slide out window bar 28. The period between instances of an automatic iteration of the execution of the steps shown in FIG. 4 is programmable and subject to the preferences of individual programmers or may even be provided as an adjustable option to a user. As an example, a periodic automatic iteration of the steps illustrated in FIG. 4 at a rate of approximately 20 times per second is considered to be a desirable rate. This delay period is independent of the execution of the steps of FIG. 4 resulting from a change in the position of the display pointer 20.

Another aspect of the preferred embodiment of the present invention is that the periodic automatic iterations occur only when the graphical user interface is waiting for the expiration of a delay period to toggle the slide out window bar 28 between retracted and unretracted states. Thus, at times when the stationary position of the display pointer 20 is immaterial to a determination by the graphical user interface of whether to toggle the state of the window bar, the periodic execution of the steps of FIG. 4 is discontinued.

Accordingly, in the preferred embodiment of the present invention, there exist two separate and distinct general types of delays. The first delay is associated with toggling the state of the slide out window bar, and the second delay concerns the periodic automatic execution of the steps illustrated in FIG. 4.

Turning now to FIG. 4, in accordance with the method of the present invention, at step 100 the graphical user interface generates a message containing a present position of the display pointer 20 and a time stamp. Next, at step 102 the graphical user interface determines whether the display pointer 20 is within a region of interest. When the window bar 28 is retracted as it is in FIG. 2, the region of interest is the detection region 22. On the other hand, when the window bar 28 is unretracted, the region of interest is the extended detection region 34. Therefore, during step 102, the graphical user interface compares the present position of the display pointer 20 to the boundaries of either the detection region 22 or the extended detection region 34, depending upon the current display state of the slide out window bar 28.

In the preferred embodiment of the present invention, the graphical user interface in a known manner maintains a record of the region of interest. The contents of the record are altered whenever the slide out window bar 28 unretracts or retracts to define the boundaries of the corresponding region of interest.

Other known alternative ways for the graphical user interface to properly identify the region of interest and compare the present position of the display pointer 20 to the proper boundary will be known to those skilled in the art of graphical user interfaces. One such alternative scheme involves storing boundary values at separate memory addresses, with one memory address corresponding to the boundaries of the detection region 22 and the other memory address having data corresponding to the boundaries of the extended detection region 34. In such a scheme, a flag indicates to the graphical user interface which memory address to read in order to determine whether the display pointer 20 is within the region of interest.

If (at step 102) the graphical user interface determines that the display pointer 20 is not within the region of interest, then control passes to step 104 where the graphical user interface determines whether the window bar 28 is unretracted by reading a flag bit associated with the state of the window bar 28. The flag bit is set to indicate that the window bar 28 is unretracted, and is cleared to indicate that the window bar 28 is retracted.

If the computer determines at step 104 that the window bar 28 is unretracted (as shown in FIG. 3) or is in the process of unretracting, then control passes to step 106 wherein the graphical user interface determines whether this is the first instance in which the graphical user interface has detected that the display pointer is outside the extended detection region 34. If this is the first such instance, control passes to step 108 wherein the computer loads a reference register with the value of the time stamp. In the illustrated embodiment, the reference register is a variable; however, the reference register may be a hardware register or other suitable software or hardware memory storage element. Control then passes to step 109 wherein the graphical user interface enables the periodic timer for periodic automatic generation of a display pointer message to initiate the execution of the routine summarized by the steps of FIG. 4. Control thereafter passes to the end (step 110).

If (at step 106) the graphical user interface determines that the display pointer 20 was positioned outside the extended detection region 34 in the previous iteration of the steps set forth in FIG. 4, then control passes to step 112 wherein the graphical user interface compares the time stamp associated with the present location of the display pointer 20 (in accordance with step 100) to a reference time stored within the reference register at step 108. The unretracted window bar 28 has associated with it a delay period which allows the user to move the display pointer 20 outside the extended detection region 34 for a certain time period before causing the window bar 28 to retract. If, by comparing the time stamp to the reference time, the computer determines at step 114 that the delay period associated with retracting the window bar 28 has not expired, then no further action is taken and control passes to the end (step 110).

If (at step 114) the graphical user interface determines that the delay period has expired, then control passes to step 116 wherein the graphical user interface clears the flag bit, thereby indicating that the window bar 28 is no longer considered unretracted by the graphical user interface. The graphical user interface updates the contents of the memory describing the boundaries of the region of interest so that the boundaries corresponding to the extended detection region 34 are replaced by the boundaries associated with the detection region 22. Thereafter, the graphical user interface initiates a subroutine causing the slide out window bar 28 to retract and be replaced by the triangle 24 illustrated in FIG. 2. Control then passes to step 118 wherein the graphical user interface disables the periodic timer responsible for periodic automatic generation of a display pointer message to initiate the execution of the routine summarized by the steps of FIG. 4. Control then passes to step 120 wherein the graphical user interface resets the reference register to indicate that no valid reference time is present in that register for subsequent iterations of the steps of FIG. 4. Control then passes to the end (step 110).

In contrast to the series of steps just described, if (at step 104) the graphical user interface determines that the window bar 28 is retracted or is in the process of retracting, then control immediately passes to step 118 described above.

If the graphical user interface determines at step 102 that the display pointer is within the region of interest, then control passes to step 124 wherein the graphical user interface determines whether the slide out window bar 28 is unretracted by reading the flag bit associated with the state of the window bar 28. If the graphical user interface determines at step 124 that the window bar 28 is retracted (as shown in FIG. 2) or is in the process of retracting, then control passes to step 126. At step 126, it is determined whether this is the first instance when the graphical user interface has detected that the display pointer is within the region of interest (i.e., detection region 22). If this is the first such instance, control passes to step 128 wherein the computer loads the reference register with the value of the time stamp (obtained during step 100). Thereafter, control passes to step 130 wherein the graphical user interface enables the periodic timer for periodic automatic generation of a display pointer message to initiate the execution of the routine summarized by the steps of FIG. 4. As previously explained, the periodic automatic generation of a mouse pointer message enables the graphical user interface to detect the expiration of a delay period in the event that the user does not alter the position of the display pointer after moving the pointer into the detection region 22. Control thereafter passes to the end (step 110).

If, however, at step 126, the graphical user interface determines that the display pointer 20 was detected inside the detection region 22 in the previous iteration of the steps set forth in FIG. 4, then control passes to step 132 wherein the graphical user interface compares the time stamp associated with the present location of the display pointer 20 (in accordance with step 100) to a reference time stored within the reference register at step 128 during a previous iteration of the steps illustrated in FIG. 4. The retracted window bar has associated with it a delay period which allows the user to move the display pointer 20 inside the detection region 22 for a time period before causing the window bar to unretract. If, by comparing the time stamp to the reference time, the computer determines at step 134 that the delay period associated with unretracting the window bar has not expired, then no further action is taken and control passes to the end (step 110).

On the other hand, if (at step 134) the graphical user interface determines that the delay period associated with unretracting the window bar has expired, then control passes to step 136 wherein the graphical user interface sets the flag bit, thereby indicating that the window bar is now considered by the graphical user interface to be unretracted. The graphical user interface updates the contents of the memory describing the boundaries of the region of interest so that the boundaries corresponding to the detection region 22 are replaced by the boundaries associated with the extended detection region 34. Thereafter, the graphical user interface initiates a subroutine causing the slide out window bar 28 to be displayed near the edge 30 of the window 26 and replace the triangle 24 illustrated in FIG. 2. Control then passes to step 138 wherein the graphical user interface disables the periodic timer responsible for periodic automatic generation of a display pointer message. Control then passes to step 140 wherein the graphical user interface resets the reference register to indicate that no valid reference time is present in that register for subsequent iterations of the steps of FIG. 4. Control then passes to the end (step 110).

If, in contrast, the graphical user interface determines (at step 124) that the window bar is unretracted or is in the process of unretracting, then control immediately passes to step 138 described above.

Figure 5:
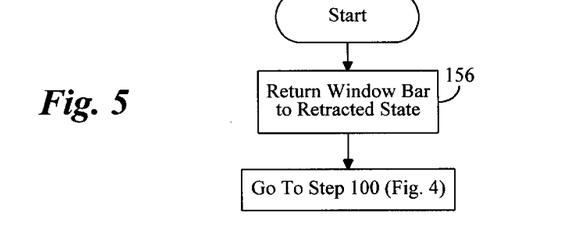
FIG. 5 is a flow diagram illustrating the steps executed by the computer system after a user clicks a mouse button while the retractable graphical interface bar is in its unretracted state.

Turning now to FIG. 5, the steps are summarized for a procedure in which the user causes the unretracted window bar 28 to retract and be replaced in the display window by the triangle 24 by clicking a mouse button. When the user clicks the mouse 16 while the slide out window bar is unretracted or is in the process of unretracting, the graphical user interface immediately executes step 156 wherein the graphical user interface retracts the window bar in the same manner described above for step 116 of FIG. 4. Thereafter, control passes to step 100 wherein the graphical user interface executes the steps summarized in FIG. 4 based upon the position of the display pointer 20 when the mouse button was clicked.

While the preferred embodiment of a method and system for providing and operating a slide out interface bar has been described, it would be known to one of ordinary skill in the area of user interfaces for computers to make certain modifications to the described method and system which would not depart from the scope and spirit of the invention. In particular, it will be readily appreciated by those skilled in the art that the present invention can be carried out in a number of different ways, including rearranging the steps summarized in FIG. 4 or using alternative appropriate status registers, flags or other feedback mechanisms to indicate the present status of a timer register and/or the slide out command bar.

Further alterations to the described embodiment of the invention might include modifying the computer resources accessible by means of the retractable interface bar. In addition to the illustrated window bar, the various embodiments contemplated for the present invention include, for example, any menu bar, command bar, title bar, tool bar, scroll bar, status bar, control menu box, help facilities and wizard tools. While the illustrated embodiment of the present invention has been described as including a mouse controlled pointer, one may alternatively substitute a light pen, track ball, or other suitable user controlled graphical selection device. One may also utilize the present invention within other computer configurations such as a local area network, or a group of computer work stations sharing a mainframe operating system. The scope of the claimed invention is not to be limited to the embodiments described herein. Rather, the scope of the present invention is intended to cover any equivalent devices and methods which fall within the spirit of the invention as defined by the appended claims.

What is claimed is:

1. A method for controlling a retractable window bar in a graphical user interface for a computer system having a display interface and a user controlled graphical selection device, the user controlled graphical selection device including a user actuated clicking mechanism for selecting from the retractable window bar a computer resource corresponding to a region of the window bar within which a pointing mechanism is positioned, said method comprising:

(a) displaying upon the display interface a target image representing the retractable window bar in a retracted state wherein the target image includes a graphic that provides a visual cue of the direction in which the window bar unretracts;

(b) defining a target detection region associated with selecting the target image, the target detection region corresponding to a position in the display interface of the target image and having a boundary that extends beyond the periphery of the target image;

(c) detecting the positioning of the pointing mechanism within the boundary of the target detection region; and (d) displaying an unretracted window bar image that includes controls for sizing a window, the unretracted window bar image replacing the display of the target image at the position in the display interface, and defining an extended detection region associated with the unretracted window bar image after said detecting the positioning of the pointing mechanism within the target detection region step and without actuating, by a user, the user actuated clicking mechanism, the extended detection region corresponding to the position in the display interface of the unretracted window bar image and having a boundary that extends beyond the periphery of the unretracted window bar image and includes the target detection region, so that the unretracted window bar image will be continuously displayed so long as the pointing mechanism is detected within the boundary of the extended detection region.

2. The method of claim 1 wherein the pointing mechanism comprises a mouse-controlled display pointer, the user actuated clicking mechanism comprises a mouse button, and actuating the user actuated clicking mechanism comprises pressing down on the mouse button.

3. The method of claim 1 further comprising the steps of:

positioning the pointing mechanism over a selected one of the controls of the unretracted window bar image; and selecting the selected control to resize the window.

4. The method of claim 1 wherein said detecting step comprises the steps of:

first detecting the pointing mechanism within the target detection region; and modifying a reference register in response to the first detecting step.

5. The method of claim 4 wherein said modifying a reference register step comprises loading a reference value from a computer system clock into the reference register.

6. The method of claim 5 wherein said detecting step further comprises the steps of:

second detecting the pointing mechanism within the target region after the modifying a reference register step;

reading a current value from the computer system clock in response to the second detecting step; and comparing the current value to the reference value within the reference register.

7. The method of claim 1 further comprising the steps of:

later detecting the positioning of the pointing mechanism outside the extended detection region while displaying the unretracted window bar image; and removing the unretracted window bar image from the display interface after said detecting the pointing mechanism outside the extended detection region step and without actuating, by a user, the user actuated clicking mechanism.

8. The method of claim 7 wherein said later detecting step comprises the steps of:

third detecting the pointing mechanism outside the extended detection region while displaying the unretracted window bar image; and modifying a reference register in response to the third detecting step.

9. The method of claim 8 wherein said modifying a reference register step comprises loading a reference value from a computer system clock into the reference register.

10. The method of claim 9 wherein said later detecting step further comprises the steps of:

fourth detecting the pointing mechanism outside the extended detection region while displaying the unretracted window bar image;

reading a current value from the computer system clock in response to the fourth detecting step; and comparing the current value to the reference value within the reference register.

11. The method of claim 7 wherein the computer system further includes a flag register indicating the state of the retractable window bar, said method further comprising the steps of:

setting the flag register to a first state in conjunction with the displaying an unretracted window bar image step; and resetting the flag register to a second state in conjunction with the removing the unretracted window bar image step.

12. The method of claim 7 wherein the removing the unretracted window bar image step includes displaying a time sequence of progressively smaller partial images of the unretracted window bar image while removing the unretracted window bar image from the display interface, thereby creating a visual impression of the retractable window bar sliding into a hidden position.

13. The method of claim 7 wherein the later detecting the positioning step comprises detecting the pointing mechanism outside the extended detection region a plurality of consecutive times.

14. The method of claim 13 further comprising the steps of:

enabling a period timer for measuring a delay time period in conjunction with the first detecting outside step; and disabling the period timer in conjunction with the removing the unretracted window bar image step.

15. The method of claim 1 further comprising the step of removing the unretracted window bar image from the display interface in response to detecting a click signal from the user actuated clicking mechanism while displaying the unretracted window bar image.

16. The method of claim 1 wherein the detecting the positioning of the pointing mechanism step comprises detecting the pointing mechanism within the target detection region a plurality of consecutive times.

17. The method of claim 16 further comprising the steps of:
   enabling a period timer for measuring a delay time period in conjunction with the first detecting step; and
   disabling the period timer in conjunction with the displaying an unretracted window bar image step.

18. The method of claim 1, further comprising the steps of:
   (a) displaying an indicator on the interface bar that corresponds to a computer resource; and
   (b) activating the computer resource when the pointer is directly positioned over the indicator and the user selection device is selecting the indicator.

19. A retractable window bar in a graphical user interface for a computer system having a display interface and a user controlled graphical selection device, the retractable window bar including controls for sizing a window, the user controlled graphical selection device including a user actuated clicking mechanism for selecting from the retractable window bar one of the sizing controls in the window bar within which a pointing mechanism is positioned, said window bar comprising:
   (a) a target image representing the retractable window bar in a retracted state, said target image including a graphic that provides a visual cue of the direction in which the window bar unretracts;
   (b) a target detection region associated with selecting the target image, the target detection region corresponding to a position in the display interface of the target image and having a boundary that extends beyond the periphery of the target image; and
   (c) a graphical interface controller for detecting the pointing mechanism within the target detection region, and in response thereto and without actuating, by a user, the user actuated clicking mechanism, displaying an unretracted window bar image, the unretracted window bar image replacing the target image at the position in the display interface and defining an extended detection region associated with the unretracted window bar image, the extended detection region corresponding to the position in the display interface of the unretracted window bar image and having a boundary that extends beyond the periphery of the unretracted window bar image and includes the target detection region, so that the unretracted window bar image will be continuously displayed so long as the pointing mechanism is detected within the boundary of the extended detection region.

20. The retractable window bar of claim 19 wherein the graphical interface controller includes a first delay means for delaying displaying the unretracted window bar image on the display interface until detecting the pointing mechanism within the target detection region a plurality of consecutive times.

21. The retractable window bar of claim 19 wherein the graphical interface controller includes means for detecting the positioning of the pointing mechanism outside the extended detection region while the display interface displays the unretracted window bar image, and in response thereto and without actuating, by a user, the user actuated clicking mechanism, removing the unretracted window bar image from the display interface.

22. The retractable window bar of claim 21 wherein the graphical interface controller includes second delay means for delaying removing the unretracted window bar image from the display interface until detecting the pointing mechanism outside the extended detection region a plurality of consecutive times.

23. The retractable window bar of claim 19 wherein the graphical interface controller further includes means for displaying a time sequence of progressively smaller partial images of the unretracted window bar image while removing the unretracted window bar image from the display interface, thereby creating a visual impression of the retractable window bar sliding into a hidden position.

24. The retractable window bar of claim 19 wherein the unretracted window bar image includes a plurality of user selectable computer resource target images, and computer resource selection means for positioning the pointing mechanism over a one of the plurality of user selectable computer resource target images and selecting a computer resource associated with the one of the selectable computer resource target image.

25. The retractable window bar of claim 24 wherein the unretracted window bar image includes a minimize window control, a restore window control, and a maximize window control.

26. The retractable window bar of claim 19 wherein the target detection region encompasses and extends beyond an area covered by the target image.

27. The retractable window bar of claim 19 wherein the extended detection region encompasses and extends beyond an area covered by the unretracted window bar image.

28. The retractable window bar of claim 19 wherein the graphical interface controller further includes means for displaying a time sequence of progressively larger partial images of the unretracted window bar image before displaying a full view of the unretracted window bar image, thereby creating a visual impression of the retractable window bar sliding out to an unretracted position.

29. The retractable window bar of claim 19 wherein the pointing mechanism comprises a mouse-controlled display pointer, the user actuated clicking mechanism comprises a mouse button.

30. A computer-readable storage medium holding instructions for performing a method for controlling a retractable window bar in a graphical user interface for a computer system having a display interface and a user controlled graphical selection device, the user controlled graphical selection device including a user actuated clicking mechanism for selecting from the retractable window bar a computer resource corresponding to a region of the window bar within which a pointing mechanism is positioned, said method comprising:
   (a) displaying upon the display interface a target image representing the retractable window bar in a retracted state wherein the target image includes a graphic that provides a visual cue of the direction in which the window bar unretracts;
   (b) defining a target detection region associated with selecting the target image, the target detection region corresponding to a position in the display interface of the target image and having a boundary that extends beyond the periphery of the target image;

(c) detecting the positioning of the pointing mechanism within the target detection region; and (d) displaying an unretracted window bar image that includes controls for sizing a window, the unretracted window bar image replacing the target image at the position in the display interface and defining an extended detection region associated with the unretracted window bar image after said detecting the positioning of the pointing mechanism within the target detection region step and without actuating, by a user, the user actuated clicking mechanism, the extended detection region corresponding to the position in the display interface of the unretracted window bar image and having a boundary that extends beyond the periphery of the unretracted window bar image and includes the target detection region, so that the unretracted window bar image will be continuously displayed so long as the pointing mechanism is detected within the boundary of the extended detection region.

31. The computer-readable storage medium of claim 30 wherein the method further comprises the steps of:

later detecting the positioning of the pointing mechanism outside the extended detection region while displaying the unretracted window bar image; and removing the unretracted window bar image from the display interface after said detecting the pointing mechanism outside the extended detection region step and without actuating, by a user, the user actuated clicking mechanism.

32. The computer-readable storage medium of claim 31 wherein said later detecting step comprises the steps of:

third detecting the pointing mechanism outside the extended detection region while displaying the unretracted window bar image; and modifying a reference register in response to the third detecting step.

33. The computer-readable storage medium of claim 32 wherein said modifying a reference register step comprises loading a reference value from a computer system clock into the reference register.

34. The computer-readable storage medium of claim 33 wherein said later detecting step further comprises the steps of:

fourth detecting the pointing mechanism outside the extended detection region while displaying the unretracted window bar image;

reading a current value from the computer system clock in response to the fourth detecting step; and comparing the current value to the reference value within the reference register.

35. The computer-readable storage medium of claim 30 wherein the displaying an unretracted window bar image step includes displaying a time sequence of progressively larger partial images of the unretracted window bar image before displaying a full view of the unretracted window bar image, thereby creating a visual impression of the retractable window bar sliding out to an unretracted position.

36. In a computer system having a display device and a mouse with buttons for positioning a mouse cursor on the display device, a method comprising the computer-implemented steps of:

displaying an icon for a retractable graphical interface bar on the display device wherein said bar may unretract to be fully displayed, said icon representing the bar in a retracted state and providing a visual indication of a direction in which the retractable graphical interface bar unretracts;

detecting that a user has positioned a mouse cursor in proximity to the icon and that the user has not activated any of the mouse buttons; and in response to the detecting, unretracting the graphical interface bar until the bar is fully displayed on the display device.

37. The method of claim 36, further comprising the step of retracting the bar until the bar is no longer displayed and the icon is displayed in place of the unretracted bar on the display device.

38. The method of claim 37 wherein the retracting is performed in response to a predetermined period of time elapsing.

39. A method for controlling a retractable graphical interface bar in a graphical user interface for a computer system having a display interface and a user controlled graphical selection device, the user controlled graphical selection device including a user actuated clicking mechanism for selecting from the retractable graphical interface bar a computer resource corresponding to a region of the retractable graphical interface bar within which a pointing mechanism is positioned, said method comprising:

(a) displaying upon the display interface a target image representing the retractable graphical interface bar in a retracted state;

(b) defining a target detection region associated with selecting the target image, the target detection region corresponding to a position in the display interface of the target image and having a boundary that extends beyond the periphery of the target image;

(c) detecting the positioning of the pointing mechanism within the boundary of the target detection region; and (d) displaying an unretracted graphical interface bar image and defining an extended detection region associated with the unretracted graphical interface bar image after said detecting the positioning of the pointing mechanism within the target detection region step and without actuating, by a user, the user actuated clicking mechanism, said displaying comprising displaying a time sequence of progressively partial images of the unretracted graphical interface bar image before displaying a full view of the unretracted graphical interface bar image, thereby creating a visual impression of the retractable graphical interface bar sliding out to an unretracted position, the extended detection region corresponding to the position in the display of the unretracted graphical interface bar image and having a boundary that extends beyond the periphery of the unretracted graphical interface bar image and includes the target detection region, so that the unretracted graphical interface bar image will be continuously displayed so long as the pointing mechanism is detected within the boundary of the extended detection region.

40. A method of accessing a graphical interface bar in a computer system having a display and a user interface selection device, said method comprising:

(a) displaying a target image that represents an interface bar, the target image being associated with a region of the display that corresponds to a position in the display for the target image, the region having a boundary that extends beyond the periphery of the target image;

(b) detecting the positioning of a pointer within the region, the position of the pointer being controlled by the user interface selection device;

(c) automatically replacing the target image at the position in the display with the interface bar when the pointer is detected within the region, the interface bar being associated with another region that corresponds to the position in the display and having a boundary that extends beyond the periphery of the interface bar and includes the region associated with the target image; and (d) automatically replacing the interface bar at the position in the display with the target image when the pointer is not detected within the other region, so that positioning the pointer within the other region will cause the interface bar to be displayed for access by a user.

* * * * *

UNITED STATES PATENT AND TRADEMARK OFFICE
CERTIFICATE OF CORRECTION

PATENT NO. : 5,914,716
DATED : June 22, 1999
INVENTOR(S) : H.V. Rubin et al.

It is certified that error appears in the above-identified patent and that said Letters Patent is hereby corrected as shown below:

| COLUMN | LINE | |
|---|---|---|
| [56]<br>Pg. 1, col. 1 | Refs. Cited<br>(Other Publs.,<br>item 1) | "4-1-4-5," should read --4-1--4-5,-- |
| [56]<br>Pg. 1, col. 2 | Refs. Cited<br>(Other Publs.,<br>item 7) | "Bulltin," should read --Bulletin,-- |
| 3 | 38 | "It an" should read --It is an-- |
| 4 | 15 | After "i.e." insert --,-- |
| 4 | 19 | After "order" insert --to-- |

Signed and Sealed this

Seventh Day of December, 1999

Attest:

Q. TODD DICKINSON

*Attesting Officer*  *Acting Commissioner of Patents and Trademarks*